United States Patent [19]

Pelham

[11] Patent Number: 5,265,929
[45] Date of Patent: Nov. 30, 1993

[54] SUN BLOCKER

[76] Inventor: Roger H. Pelham, 118 Sparks St., Trotwood, Ohio 45426

[21] Appl. No.: 47,401

[22] Filed: Apr. 19, 1993

[51] Int. Cl.[5] .................................................. B60J 3/02
[52] U.S. Cl. .................................. 296/97.6; 296/97.9; 296/97.11; 24/523; 248/231.8
[58] Field of Search ............... 296/97.6, 97.9, 97.11; 248/231.8, 316.4, 316.7; 24/523; 224/312

[56] References Cited

U.S. PATENT DOCUMENTS

| | | | |
|---|---|---|---|
| 1,286,352 | 12/1918 | Kubat | 248/291 |
| 2,212,007 | 8/1940 | Buchanan | 296/97.6 |
| 2,894,576 | 7/1959 | Williams | 296/97.6 X |
| 2,916,838 | 12/1959 | Campbell | 40/593 |
| 2,941,839 | 6/1960 | Pendlebury | 296/97.6 |
| 3,428,360 | 2/1969 | Honor, Sr. | 296/97.6 |
| 3,584,910 | 6/1971 | Lupul | 296/97.6 |
| 3,877,745 | 4/1975 | Girard | 296/97.6 |
| 3,948,554 | 4/1976 | Barbee | 296/97.6 |

FOREIGN PATENT DOCUMENTS

| | | | |
|---|---|---|---|
| 0550568 | 3/1923 | France | 24/523 |
| 0811954 | 4/1959 | United Kingdom | 24/523 |

*Primary Examiner*—Dennis H. Pedder
*Attorney, Agent, or Firm*—Biebel & French

[57] ABSTRACT

The present invention is a disc-type sun blocker which is attached to a vehicle's sun visor for blocking the sun. The sun blocker is rotatably attached to an attachment bracket. The attachment bracket slides along the sun visor for adjustment along the horizontal axis and the rotation of the disc provides adjustment along the vertical axis. The disclosed invention provides a low cost, adjustable sun blocker which selectively extends the blocking of the sun's rays of a vehicle's sun visor.

2 Claims, 3 Drawing Sheets

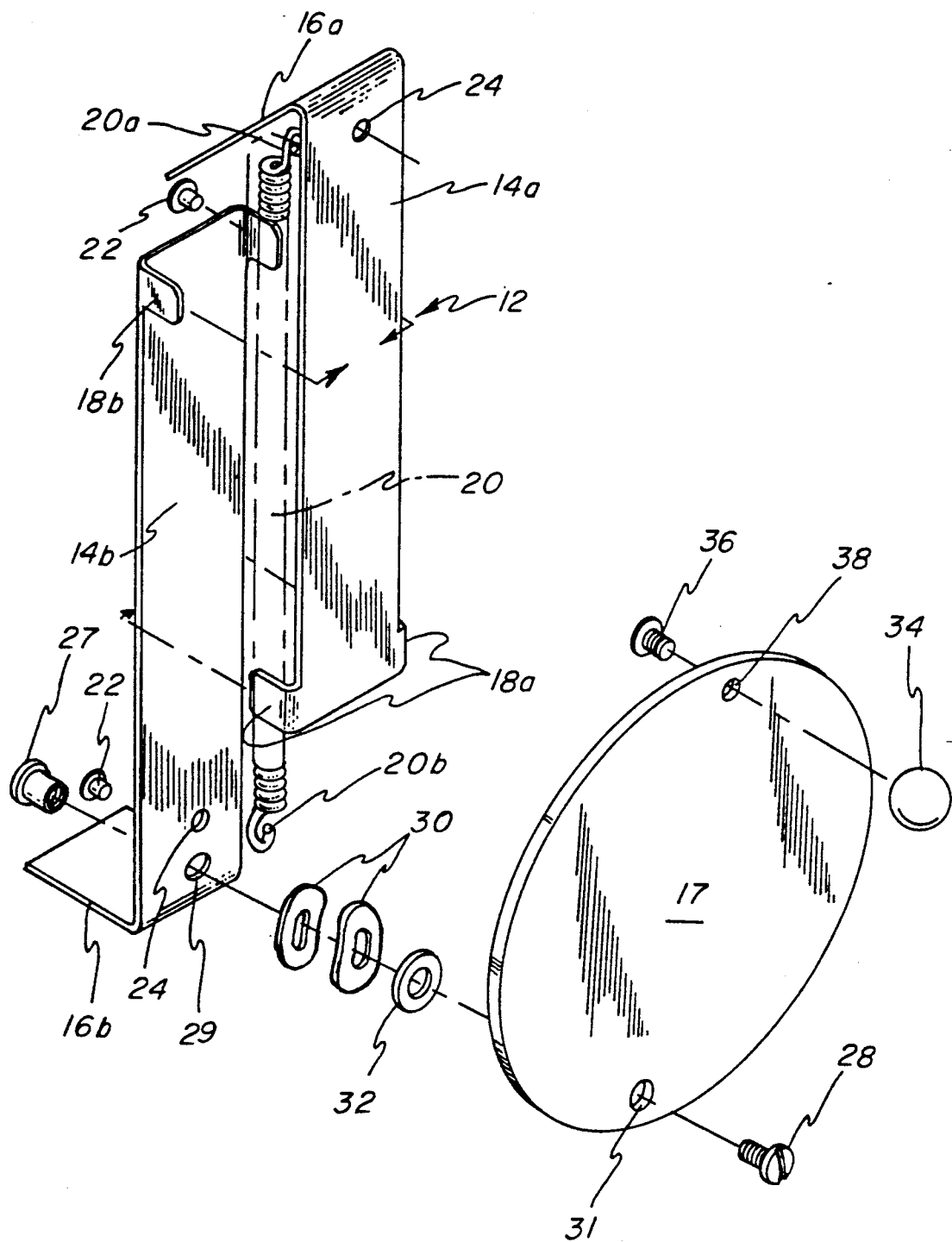

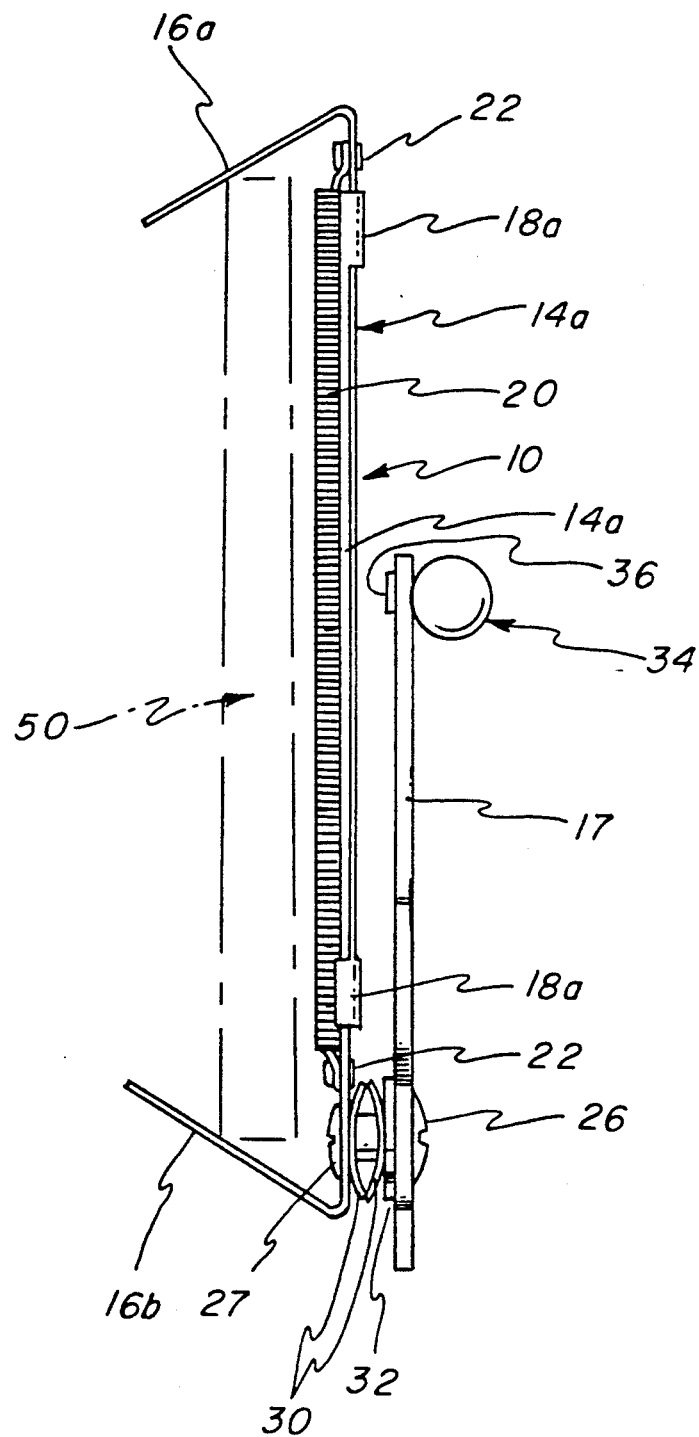

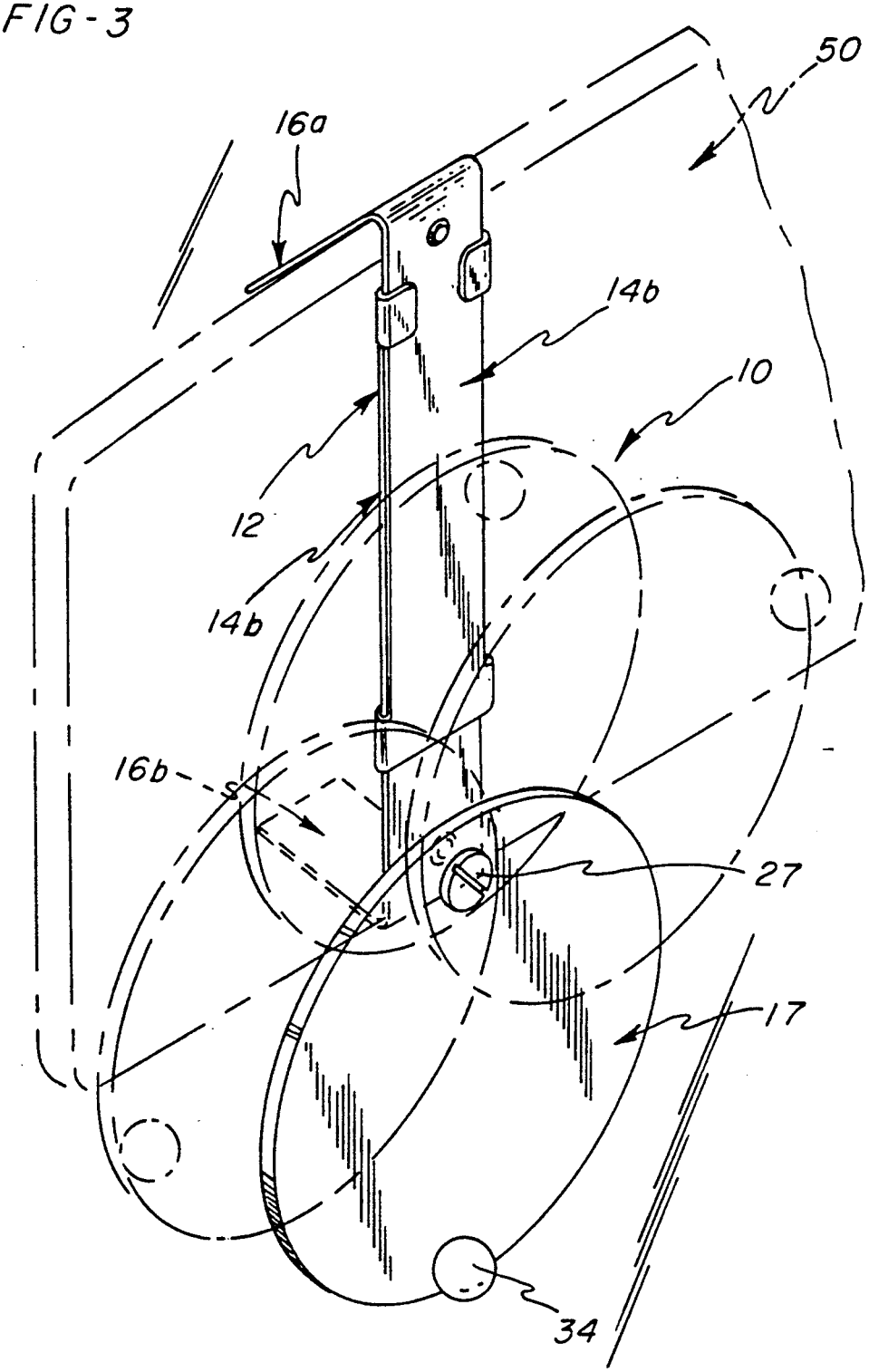

SUN BLOCKER

BACKGROUND OF THE INVENTION

This invention relates to visor-mounted sun blocker discs for motor vehicles, and more particularly to a sun disc-type blocker which may be easily attached to and detached from a sun visor by one hand.

Disc-type sun blockers have been suggested for use as a sun visor or as an attachment to a sun visor for motor vehicles, as a motoring aid to block the direct rays of the sun from the driver's eyes. Usually, a sun-blocking disc is mounted on a sun visor so that it can be moved with respect to the sun visor, and located to prevent the sun from blinding the operator or driver of the motor vehicle. The discs are usually made of material which is totally opaque to the rays of the sun and are of a size, in relation to the position of the driver, sufficient to block the image of the sun and yet provide substantial vision around the disc periphery where the sun's rays are not objectionable.

While adjustable sun-blocking discs can be helpful and useful to the operator of a motor vehicle, and improve the ability to operate the vehicle safely in those conditions in which a low-angle sun is directly in view in a windshield, such devices are not in general use. The lack of use is believed to be due primarily to the fact that complicated and expensive means have been suggested by which the disc type sun blocker may be moved along the length of the visor and pivoted between a storage position behind the visor and from side to side as necessary to bring the disc into a blocking relation to the sun's rays. The complexity and cost of such support and attaching devices have been a deterrent to the economical manufacture and use of such devices.

Proposed mounting arrangements have included permanent or semi-permanent attachment apparatus, often in the form of elongated tracks or other supports which have a portion permanently affixed or attached to the visor. Such tracks then provide for the mounting of a slidable member and for the attachment of the disc on an lever extending from the slidable member. Examples of sun discs and sun shields which are mounted in combination with visor supported tracks include Williams, U.S. Pat. No. 2,894,576 issued Jul. 14, 1959; Girard. U.S. Pat. No. 3,877,745 issued Apr. 15, 1975; Honor, Sr., U.S. Pat. No. 3,428,360 issued Feb. 18, 1969 and Pendlebury, U.S. Pat. No. 2,941,839 of Jun. 21, 1960. In these complicated arrangements, the sun disc cannot be readily attached or detached such as with one hand nor can it readily be moved along the visor. Apart from the inconvenience of use, the expense of the attachment apparatus and the necessity to tailor each for use with a particular type of visor has inhibited the success of this highly useful and effective safety concept.

SUMMARY OF THE INVENTION

This invention is directed to an adjustable disc-type sun blocker or shield for motor vehicle use, and more particularly to such a device having a simplified, low-cost detachable mount which may be readily operated in a one-handed fashion, and made with principal parts which are low cost, sheet metal stampings.

An attachment bracket consists of a pair of interfitted and mutually slidable sheet metal members or sections which may be formed from identical stampings. One end of each of the slidable members is turned transversely of the body and slightly inwardly, so that the end may be easily slipped over and received along one edge of the visor, and the other end of the member may be received over the other edge of the visor. An elongated coil tension spring has one end thereof attached to one of the members and the other end attached to the other member and tends to draw the two inwardly turned ends of the members toward each other and into a gripping engagement with the visor.

When the bracket is attached to a lowered visor there is formed an upper body member which is positioned more closely to the top of the windshield and a lower body member which extends to a position below the visor. An opaque, circular sun blocker disc is suitably attached to the lower member by means of a frictional pivot. The pivot is offset in relation to the center of the disc and is adjacent an edge thereof. The disc is rotated by means of a hand-gripping device, such as a small knob.

The disc is pivoted about the axis of its attachment and is frictionally held in place, such as by a pair of curved spring washers on an attaching bolt positioned between the disc and the body of the lower such member adjacent to the inwardly turned end thereof. The friction coupling provided by the spring washers is sufficient to hold the disc in any adjusted position.

The sun blocker may be moved along the length of the visor simply by pulling down on the disc to spread the ends apart and attaching the assembly at a different location. The attachment is effected simply by looping one of the ends over the top of the visor, pulling the two slidable body members apart from each other against the bias of the spring and looping the lower inwardly turned end over the bottom of the visor. It may just as easily be removed or moved to a more desirable location. The sun disc assembly or blocker of this invention is easily attached or removed in a one-handed operation.

DETAILED DESCRIPTION OF THE DRAWINGS

FIG. 1 is an exploded view of the disc-type sun blocker of the present invention;

FIG. 2 is a side view of the blocker attached to a sun visor; and

FIG. 3 is a perspective view thereof.

DESCRIPTION OF THE PREFERRED EMBODIMENT

Referring to FIGS. 1 and 2, the disc-type sun blocker 10 has an attachment bracket 12 with an upper body member 14a and a lower body member 14b. Each of the body members 14 has an inwardly turned visor gripping end 16a and 16b for gripping the sun visor 50. The opaque sun blocking disc 17 is rotatably attached to lower body member 16b. The sun blocker 10 is adjusted along the sun visor 50 and the disc 17 is rotatably adjusted such that the sun's rays are blocked from the operator of the vehicle.

More specifically, the upper and lower body members 14 are interfitted in mutually slidable relationship. The body members 14 are identical sheet metal stamped members. Tab members 18a are wrapped around the edges of the lower body member 14b on the same side as gripping end 16b. Tab members 18b are wrapped around the edges of the upper body member 14a on the opposite side as gripping end 16a. The tab members 18 maintain the body members 14 in mutually slidable relationship and are made of metal which can be custom bent by hand to be tailor fitted to a given sun visor, if desired.

The elongated coil tension spring 20 has two opposing ends, one end 20a is attached to the upper body member 14a and the opposing end 20b is attached to the lower body member 14b. The coil spring 20 is attached to the body members 14 by rivets 22 which pass through holes 24 adjacent the gripping ends 16 in each body member 14. The tension of the coil spring 20 pulls the gripping ends 16a and 16b towards each other. This tension allows the gripping ends 16 to grip the edges of the sun visor 50 for maintaining the bracket 12 in the horizontal position along the sun visor 50.

The disc 17 is pivotally or rotatably mounted adjacent its perimeter to the lower body portion 14b by screw 28 and stud 27. The stud 27 passes through a hole 29 in the lower body member 14B, spring washers 30, slide washer 32, and a hole 31 in disc 17. The stud 27 is secured therein by screw 28. A pair of spring washers 30 provides a frictional coupling between the lower body member 14b and the disc 17, such that the disc 17 is held in and pivotal position about the stud 27.

A knob 34 is attached to the disc 17 adjacent an edge thereof opposite the stud 27. The knob 34 is attached to the disc 17 by a knob screw 36 which passes through a hole 38 in the disc. The knob 34 provides a means to rotate the disc 17 about stud 27.

Referring to FIG. 3, it is specifically shown how the attaching bracket 12 attaches to the sun visor 50. The disc-type sun blocker 10 is adjusted along the sun visor 50 by pulling down on the disc knob 34, thereby extending gripping end 16b of the lower body member 14B away from the gripping end 16a of the upper body member 14a. This extension allows the gripping end 16b of the lower body member to disengage the lower edge of the sun visor 50 for moving the disc sun blocker 10 laterally along the sun visor 50 in the appropriate position for blocking the sun.

The disc 17 is adjusted by rotating the disc 360° around stud 27 to various positions, as shown in phantom in FIG. 3. Thus, the disc 17 can be adjusted at various lowered positions with respect to the visor 50 in order to block the sun's rays, or rotated to a storage position behind the visor.

The disc sun blocker 10 of the present invention provides a low cost, one-hand adjustment of the sun visor to block the sun's rays. The adjustability by the pivotal rotation of the disc 17 with respect to the lower body member 14b provides the needed adjustment in order to block the sun's rays along the horizon.

The lower gripper end 16b may, if desired, be bent at its remote end upwardly in order to provide a better or improved gripper action along the bottom edge of a visor. Generally, it is not desirable to provide a second bend in the gripping end 16a since this would make it more difficult to hook over the top of a lowered visor in those cases where already there is limited clearance between the visor and the roof liner of the automobile or truck.

While the form of apparatus herein described constitutes a preferred embodiment of this invention, it is to be understood that the invention is not limited to this precise form of apparatus, and that changes may be made therein without department from the scope of the invention which is defined in the appended claims.

What is claimed is:

1. A disc-type sun blocker adapted to be removably mounted on a sun visor of a motor vehicle comprising:
   a disc support assembly including a pair of substantially overlapping first and second relatively flat and longitudinally extending body portions formed of sheet material,
   each of said body portions, at one end thereof, terminating in a laterally and inwardly extending visor-gripping end,
   each of said body portions having tab means formed thereon partially encircling the adjacent body portion providing guideways by means of which said body portions may slide relatively to each other, thereby extending or reducing the spacing between said visor-gripping ends,
   a spring having a pair of ends, one each of said ends connected to a different one of said body portions adjacent said gripping ends and tending to cause said body portions to slide so as to pull said gripping ends together and providing for relative extension movements thereof to permit said gripping ends to be inserted respectively over top and bottom edges of a motor vehicle sun visor; and
   a sun-blocking disc,
   means pivotally mounting said disc in offset relation to the center thereof to one of said body members adjacent its said gripping end,
   said pivotal mounting means including friction means for pivotal movement of said disc about said mounting means and supporting said disc in an adjusted position,
   said disc support assembly permitting one-handed attachment to a visor by inserting one of said visor-gripping ends over one edge of said visor, causing said body portions to move relative to each other against the tension of said spring and moving the other of said visor-gripping ends over the opposite edge of the visor, with the disc thereof being positioned below the visor providing for adjustment thereof to block direct sun rays.

2. A disc-type sun blocker for automotive vehicles which have a sun visor, comprising:
   a disc support assembly including first and second substantially identical sheet metal body portions,
   each of said body portions having an elongated flat section terminating in a transversely extending extension at one end thereof, the flat section of one of said body portions being positioned adjacent the corresponding flat section of the other of said body portions with said extensions extending laterally of said body portions and spaced from each other,
   said extensions being proportioned to be received over a respective upper or lower edge of a sun visor,
   each of said body portions having tab means engaging the adjacent said body portion providing for relatively sliding movement, one body portion to the other,
   a coil tension spring having one end connected to one of said body portions and an opposite end connected to the other of said body portions tending to resist the spreading apart of said extensions; and
   a sun-blocking disc formed of a material opaque to the sun's rays,
   means pivotally mounting said disc on one of said body portions at a side thereof opposite the associated said extension, said disc pivotal mounting means including friction means supporting said disc in any pivotal adjusted position on said disc support assembly, said assembly being mountable on a sun visor by the insertion of one of said extensions over one of a visor edges causing said body portions to slide one relative to the other against the tension of said spring for inserting the other of said extensions over an opposite edge of the visor and causing said extensions to grip the visor under the influence of said spring.

* * * * *